Aug. 19, 1941.  H. L. MINAKER  2,253,283
CARTON HANDLING AND UNLOADING MACHINE
Filed Jan. 4, 1940  12 Sheets-Sheet 2
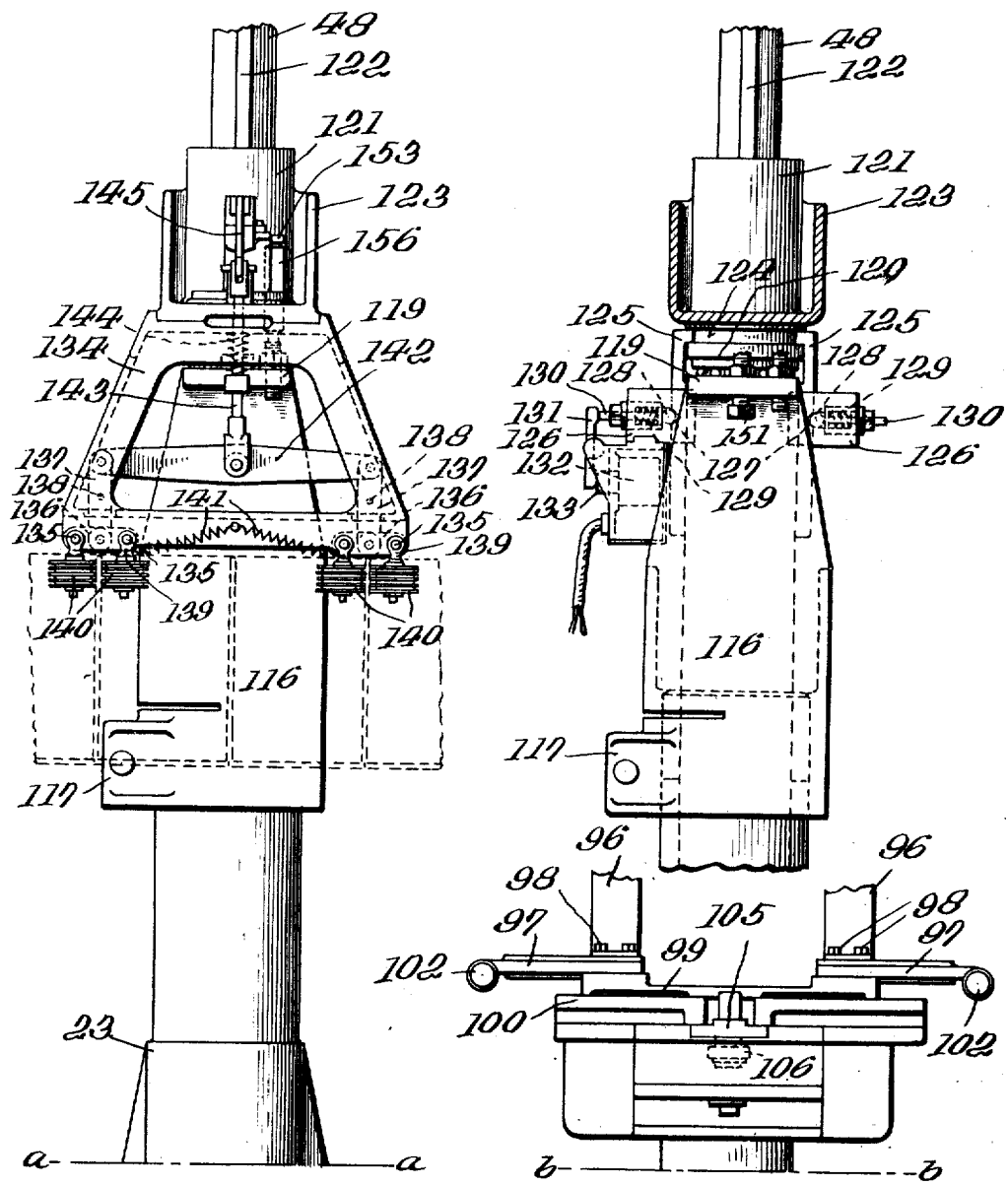

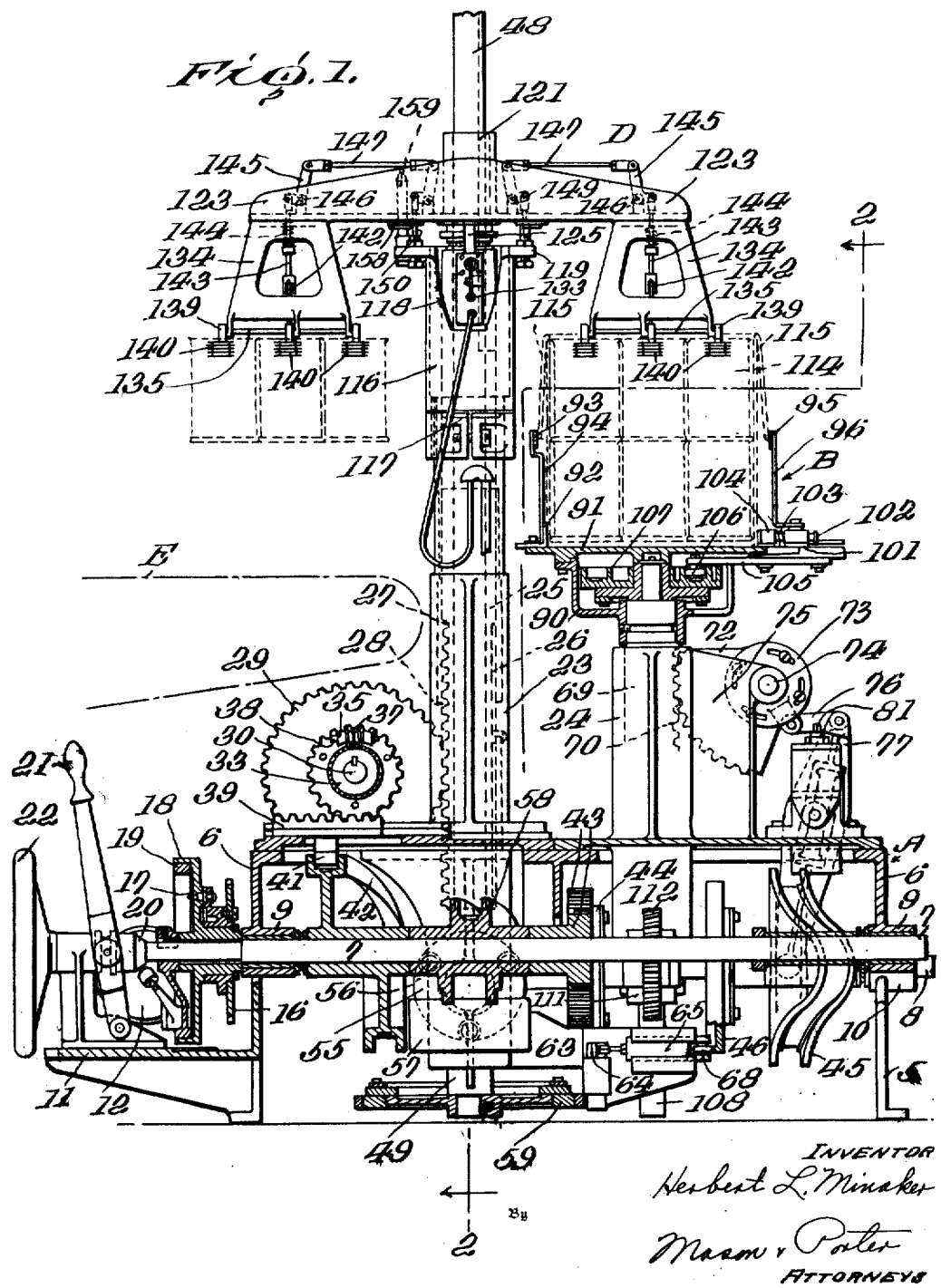

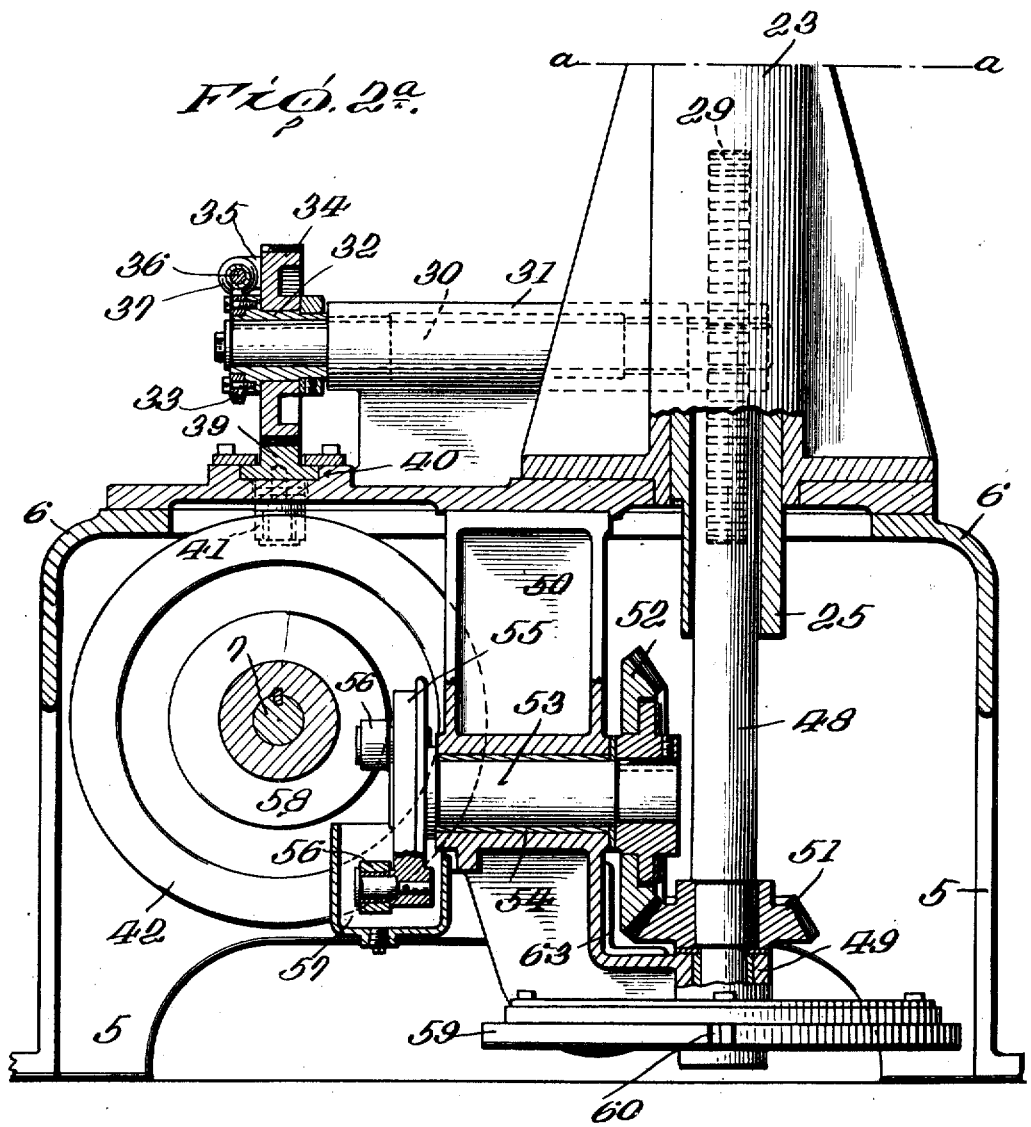

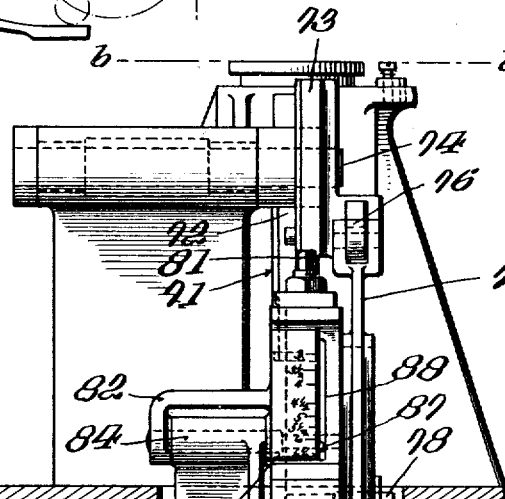

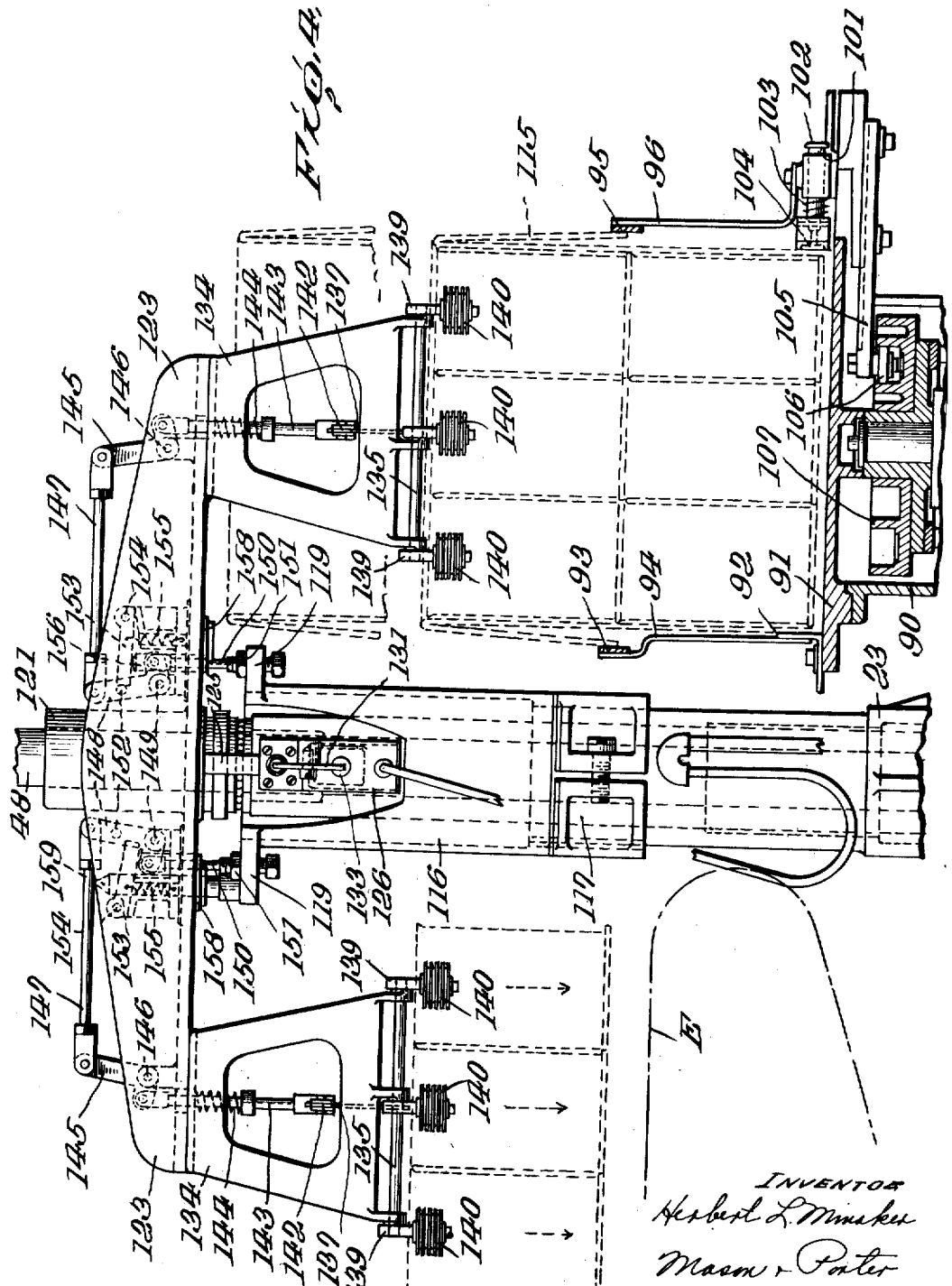

Aug. 19, 1941.   H. L. MINAKER   2,253,283
CARTON HANDLING AND UNLOADING MACHINE
Filed Jan. 4, 1940   12 Sheets-Sheet 6
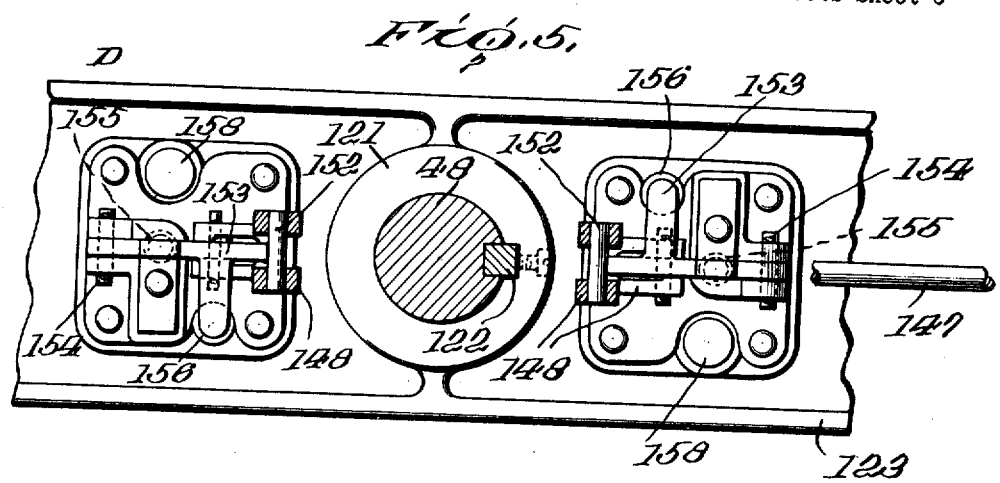
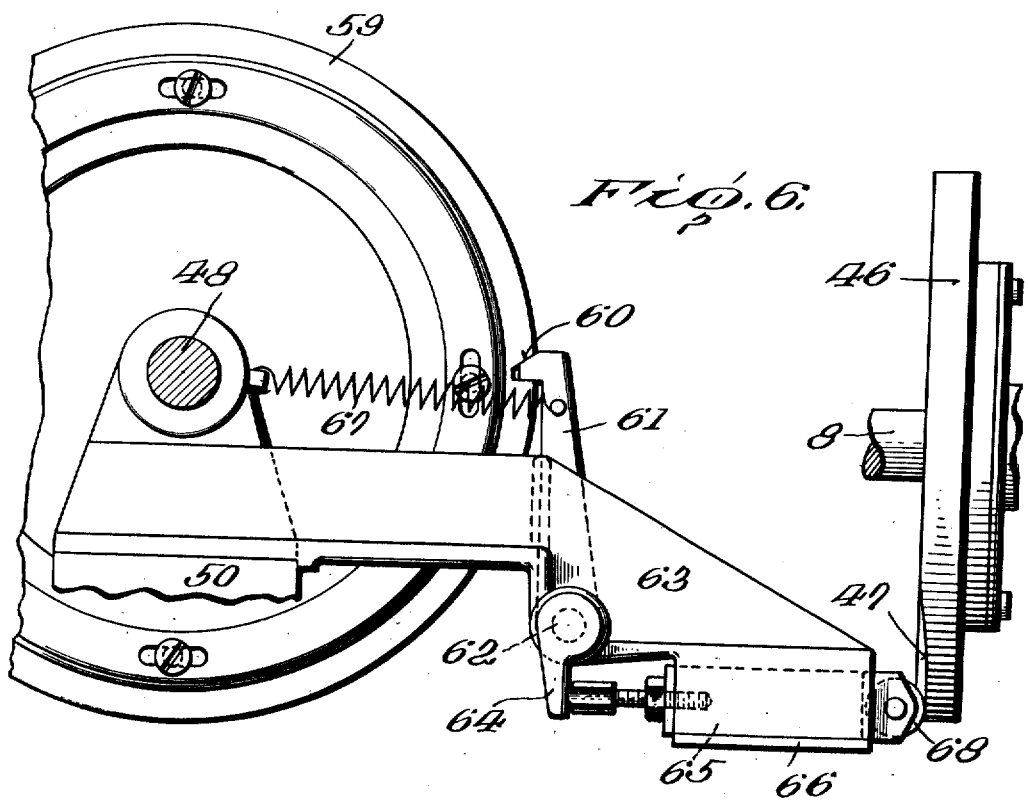
INVENTOR
Herbert L. Minaker
Mason & Porter
ATTORNEYS Aug. 19, 1941.    H. L. MINAKER    2,253,283
CARTON HANDLING AND UNLOADING MACHINE
Filed Jan. 4, 1940    12 Sheets-Sheet 7
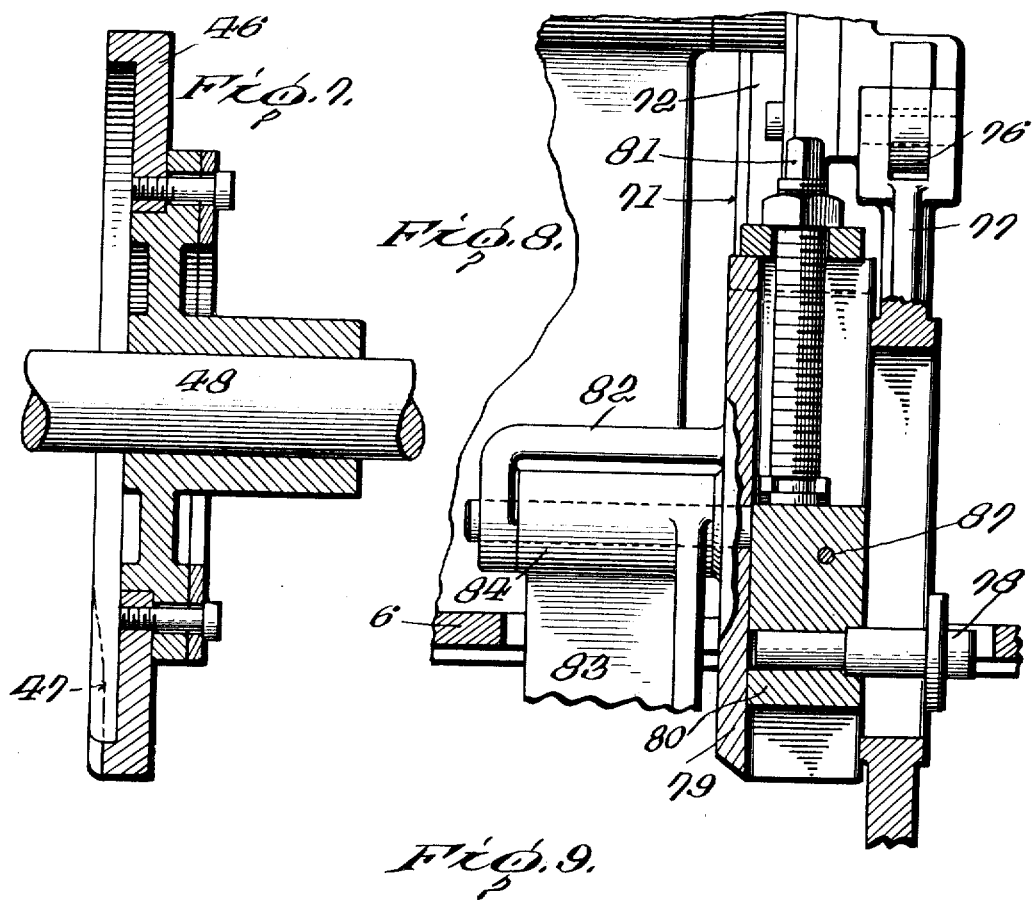
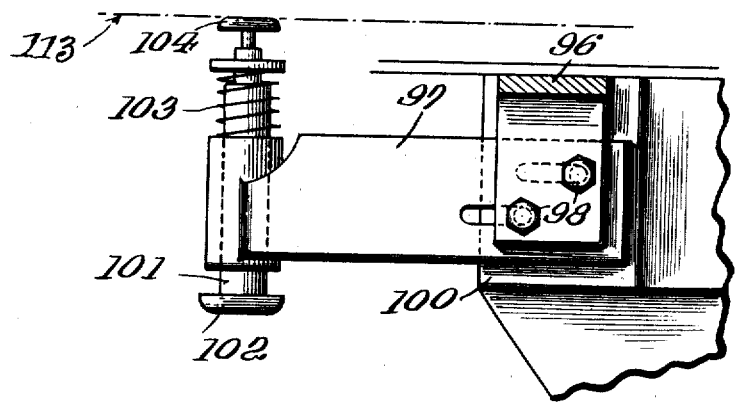
INVENTOR
Herbert L. Minaker
Mason & Porter
ATTORNEYS Aug. 19, 1941.　　　　H. L. MINAKER　　　　2,253,283
CARTON HANDLING AND UNLOADING MACHINE
Filed Jan. 4, 1940　　　12 Sheets-Sheet 8
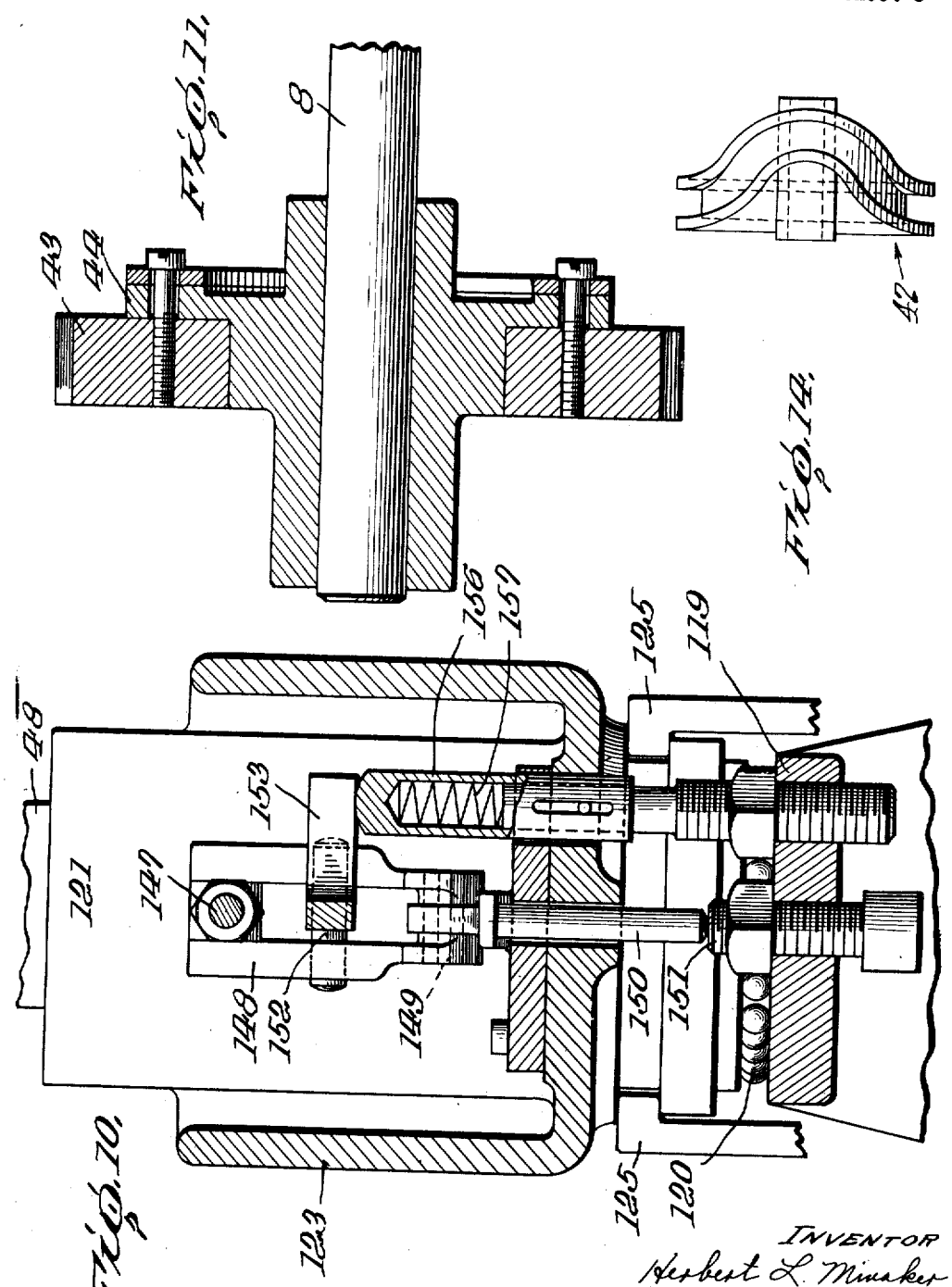
INVENTOR
Herbert L. Minaker
Mason, Porter
ATTORNEYS

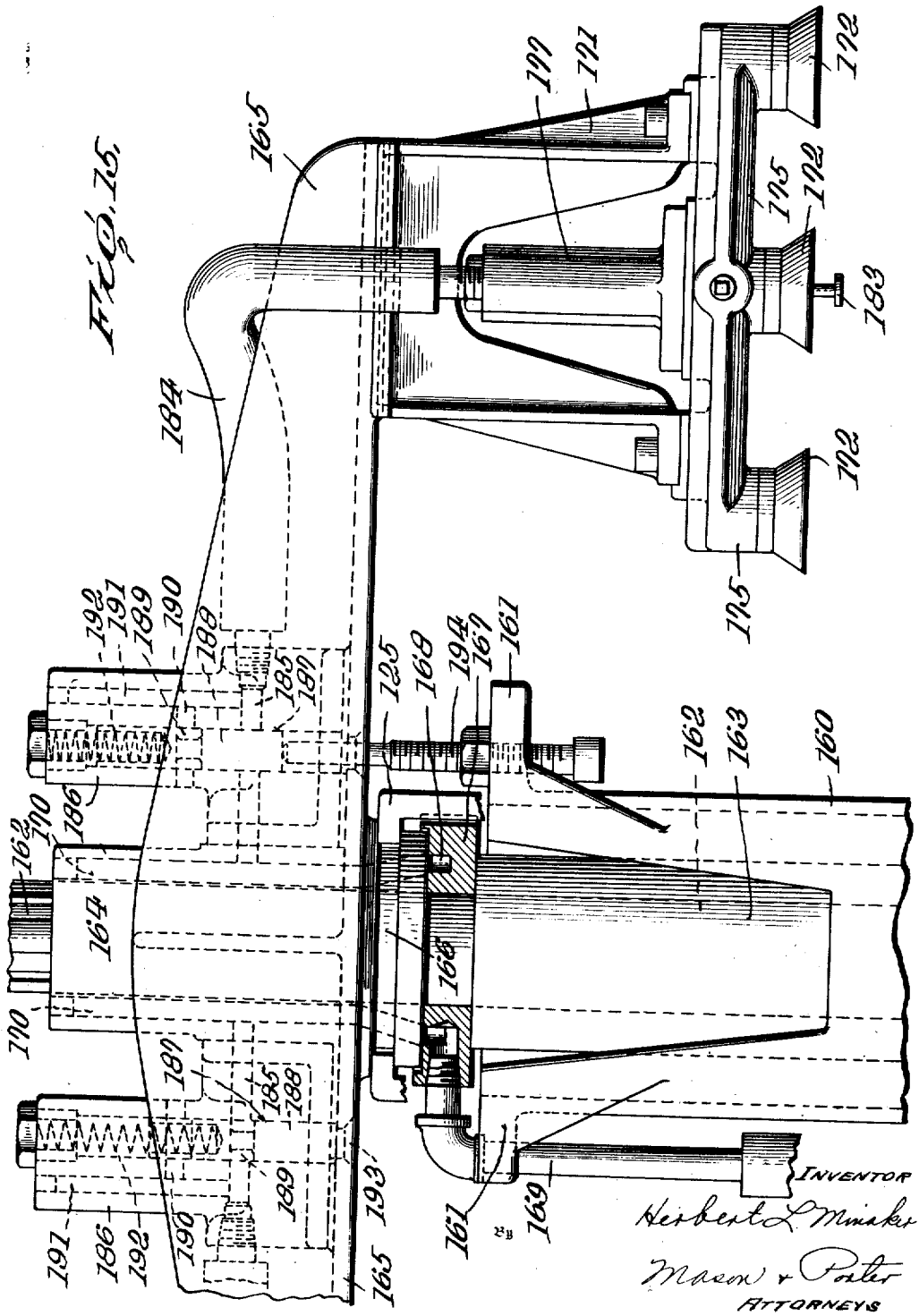

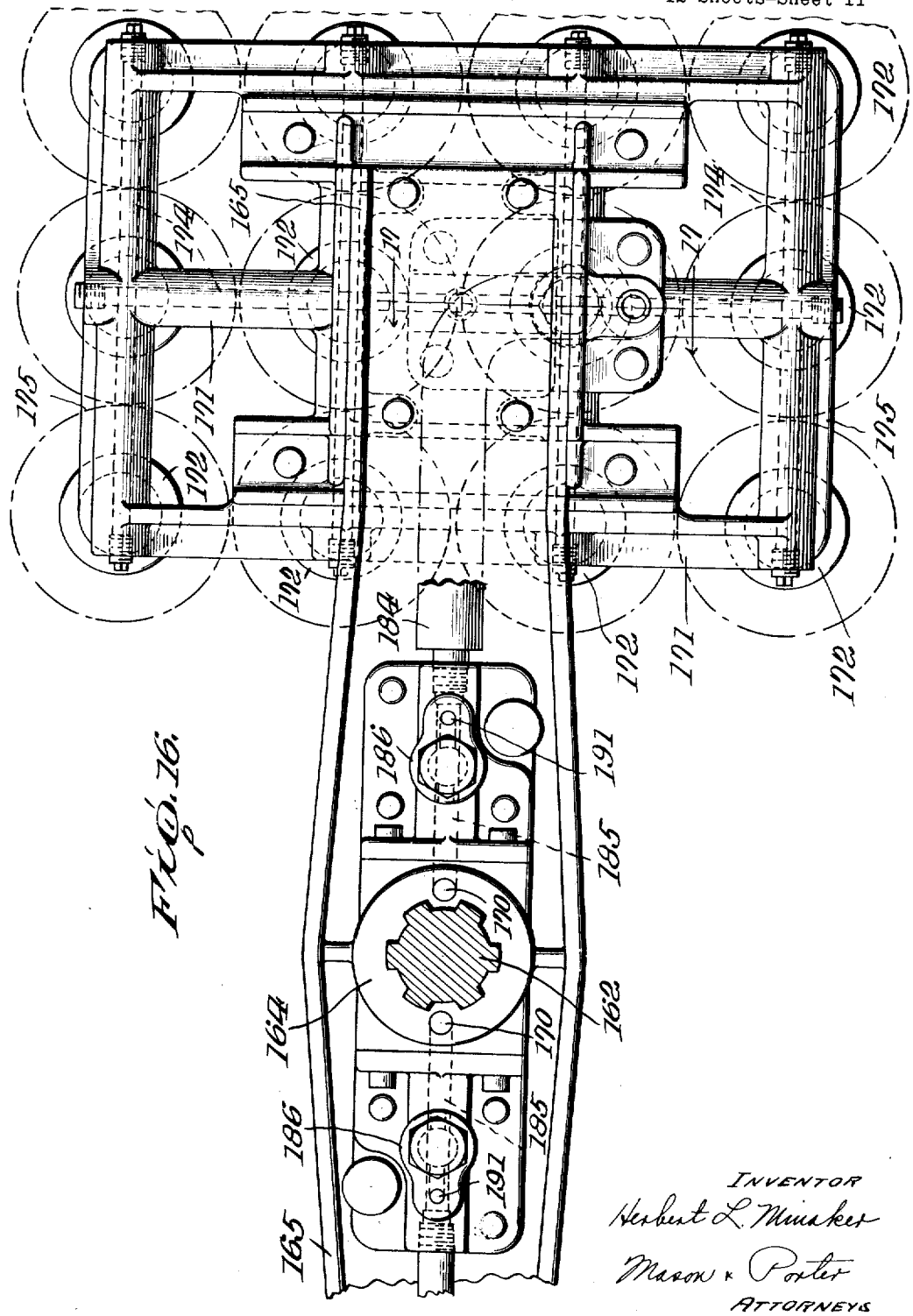

Aug. 19, 1941.  H. L. MINAKER  2,253,283
CARTON HANDLING AND UNLOADING MACHINE
Filed Jan. 4, 1940  12 Sheets-Sheet 12
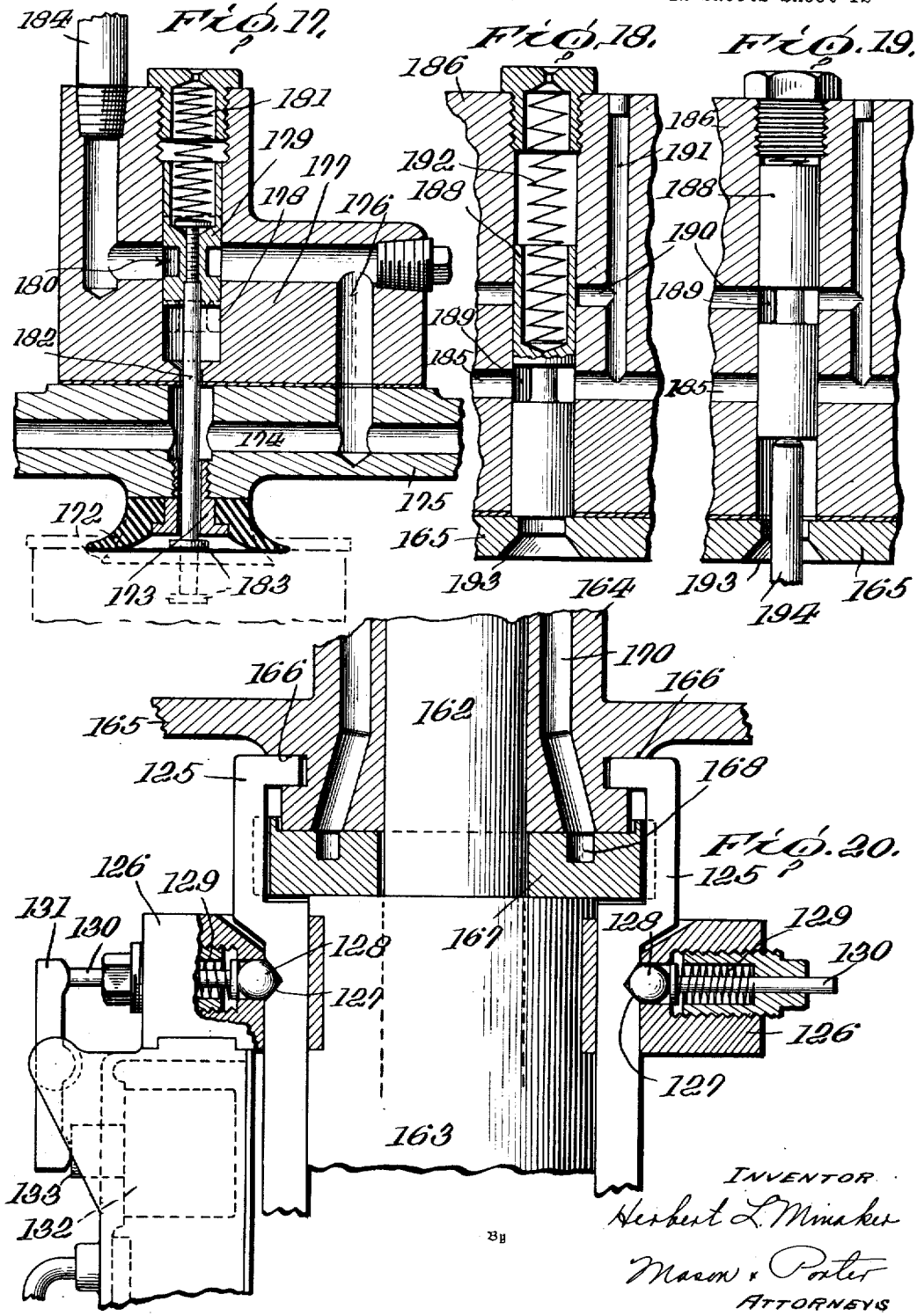

Patented Aug. 19, 1941

2,253,283

UNITED STATES PATENT OFFICE 2,253,283

CARTON HANDLING AND UNLOADING MACHINE

Herbert L. Minaker, Syracuse, N. Y., assignor to Continental Can Company, Inc., New York, N. Y., a corporation of New York Application January 4, 1940, Serial No. 312,429

29 Claims. (Cl. 214—1.1)

The invention relates generally to handling and unloading apparatus and primarily seeks to provide a novel machine having a table for supporting cartons containing empty cans arranged therein in multiple rows and tier upon tier and onto which the cartons are fed one by one, and means insertible in and removable from the cartons for removing cans therefrom a whole tier at a time.

An object of the invention is to provide a machine of the character stated in which means is included for bringing about relative movement between the table and the can tier gripping means for causing the can tiers to be gripped and removed serially.

Another object of the invention is to provide a machine of the character stated in which there is provided means for moving the can gripping means a definite distance to cause said means to engage with cans of an upper tier, and means for moving the table toward the gripping means for presenting a lower tier of cans for engagement by said gripping means.

Another object of the invention is to provide a machine of the character stated in which the table is movable vertically for successively presenting can tiers at the gripping level, in which a can gripping means depends from each end of a cross arm mounted to rotate in steps of 180° each about a central pivot to grip a can tier at one stop position of the arm and then translate said can tier and release it at the next succeeding stop station of said arm.

Another object of the invention is to provide novel means for altering the degree of vertical movement imparted to the table so that the machine can be adapted for unloading cans of different sizes.

Another object of the invention is to provide novel means at one stop station of the cross arm for effecting a can gripping action of the gripping means, and novel means at the other stop station for effecting a can releasing action of the gripping means.

Another object of the invention is to provide novel means for preventing overthrow of the gripping means carrying arm at the stop stations, and novel means for assuring proper alignment of the gripping means with the cans-to-be-gripped.

Another object of the invention is to provide novel means for holding cartons on the table during unloading of cans therefrom.

Another object of the invention is to provide novel means for discontinuing the application of power to the machine parts whenever a jamming of mechanism occurs.

Another object of the invention is to provide a novel form of can gripping means for simultaneously gripping and lifting all of the cans comprising a tier.

Another object of the invention is to provide a novel form of can gripping means which operates pneumatically.

With the above and other objects in view that will hereinafter appear, the nature of the invention will be more fully understood by following the detailed description, the appended claims, and the several views illustrated in the accompanying drawings.

In the drawings:

Figure 1 is a side elevation and part vertical sectional view of a machine embodying the invention.

Figures 2 and 2a together comprise a vertical cross section taken substantially on the line 2—2 on Figure 1.

Figures 3 and 3a together comprise a right hand elevation of the machine parts as shown in Figure 1, the frame base and a portion of the gripper carrying cross arm being shown in vertical cross section.

Figure 4 is an enlarged side elevation illustrating the carton supporting table and the gripping means, the table being shown in central vertical section.

Figure 5 is a fragmentary plan view illustrating one of the gripping means latching equipments carried by the cross arm.

Figure 6 is an enlarged fragmentary horizontal section illustrating the means for preventing overthrowing of the cross arm.

Figure 7 is a detail view illustrating the stop dog releasing cam shown in Figure 6.

Figure 8 is a fragmentary detail sectional view illustrating the means for adjusting the position of the sector lever fulcrum.

Figure 9 is an enlarged fragmentary plan view illustrating one of the adjustable carton clamping elements.

Figure 10 is an enlarged fragmentary vertical sectional view illustrating the yieldably mounted latch arm releasing pin.

Figure 11 is an enlarged fragmentary sectional view illustrating the adjustment of the shaft gear couple which permits relative positioning of the shafts.

Figure 14 is a detail view illustrating the table lifting cam.

Figure 15 is an enlarged fragmentary front elevation illustrating the cross arm equipped with a gripping means of a pneumatically actuated type, parts being broken away and in section.

Figure 16 is a plan view of the parts illustrated in Figure 15, parts being broken away and in section.

Figure 17 is a detail vertical cross section taken on the line 17—17 on Figure 16.

Figures 18 and 19 are enlarged detail vertical sectional views respectively illustrating an arm carried control valve positioned in the vacuum drawing and vacuum relieving positions.

Figure 20 is an enlarged fragmentary vertical section illustrating the overload release coupling between the gripping means carrying arm and its supporting sleeve.

Figure 21 is a side elevation of the column or cross arm indexing cam.

Figure 22 is a diagrammatic indexing face development of the cam illustrated in Figure 21.

Figure 12:
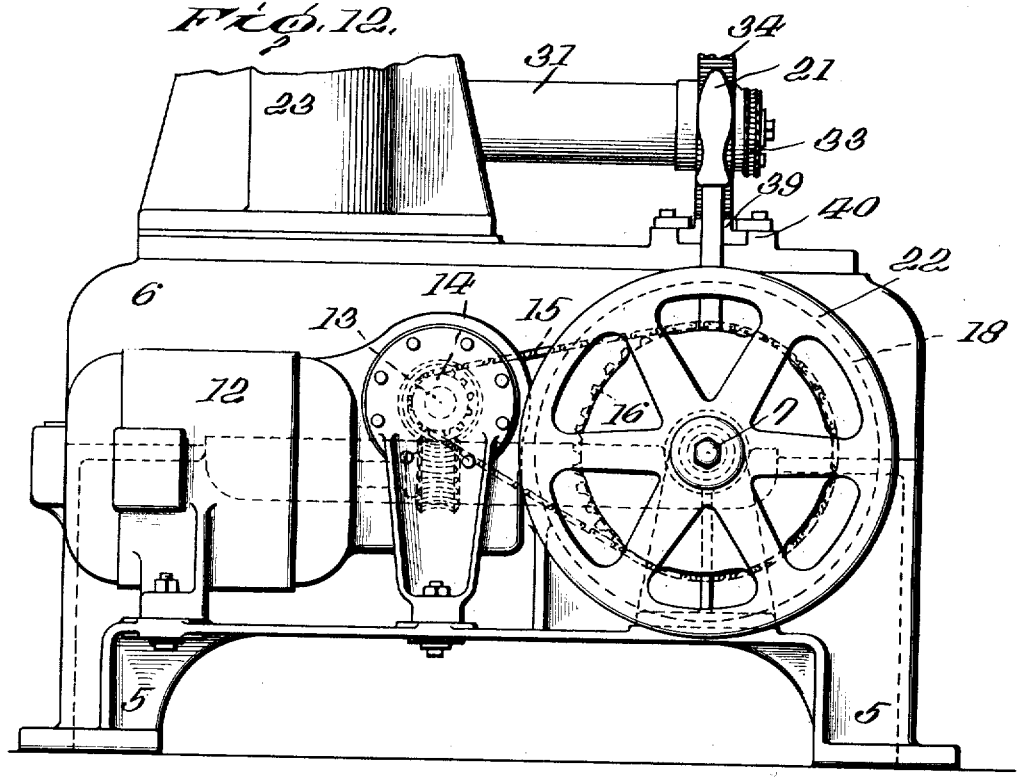
Figure 12 is a fragmentary end elevation illustrating the driving motor and driven shaft connection.
Figure 13:
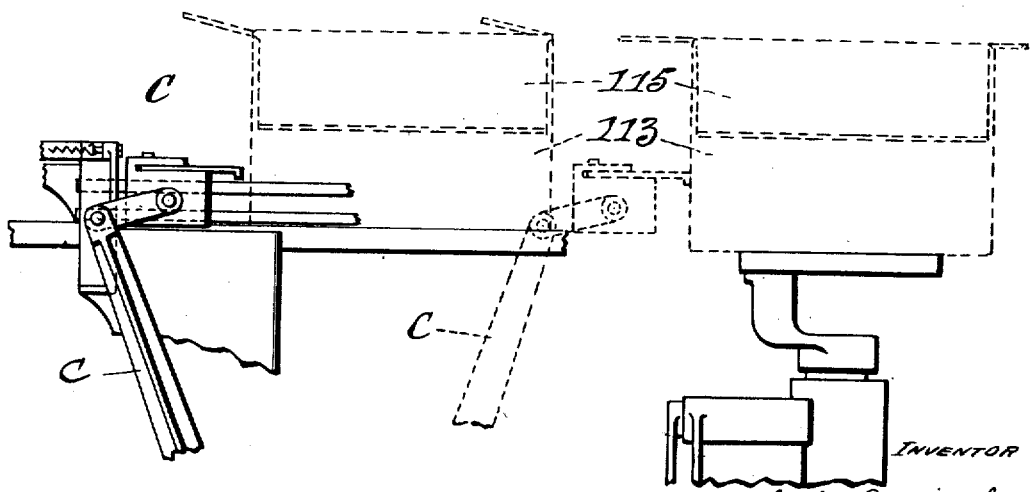
Figure 13 is a fragmentary end elevation illustrating the carton supporting table, a fragment of a carton feeding means also being shown diagrammatically.

The machine herein illustrated as an example of embodiment of the invention includes a supporting base structure A, a vertically reciprocable carton support or table B onto which cartons bearing empty cans arranged in rows and superposed tiers are fed one by one by a conveyor C, and a gripper and translater head or cross arm D operable to simultaneously grip a row or tier of cans in a carton, withdraw said cans from the carton and translate them to a position over and release them onto a suitable take-off or unscrambling conveyor E.

The base structure A includes legs 5 on which are mounted a bed portion 6 in which shafts 7 and 8 are rotatably supported in horizontally spaced parallel relation in suitable bearings 9 and 10.

A shelf or bracket 11 extends from the base and supports a driving motor 12 which drives a countershaft 13 through suitable reduction gearing. A driver sprocket 14 is secured upon the shaft 13, and the rotation of this sprocket is transmitted through a chain connection 15 on the sprocket rotor 16 connected in drive relation through a shear pin 17 with a driver wheel 18 free upon the shaft 7. The driver wheel 18 can be connected in driving relation with the shaft 7 by a clutch head or ring equipment 19 which is keyed to the shaft 7 and may be operatively engaged with the wheel 18 by actuator devices 20 operable through the medium of a hand lever 21. The shaft 7 may also be rotated manually through the medium of a hand wheel 22.

An unloader supporting sleeve standard 23 extends upwardly from the bed 6, and a carton table supporting sleeve standard 24 similarly projects from said bed. The standard 23 serves as a mounting for a vertically reciprocable unloader sleeve 25 which is held against rotation in the standard by a pin and groove equipment 26, and the sleeve includes a rack portion 27 which is accessible through an opening 28 in the standard. A spur gear 29 secured upon a shaft 30 rotatable in a frame supported bearing 31 meshes with the rack face 27 of the sleeve 25. The shaft 30 has a sleeve 32 keyed thereon, and a worm wheel 33 is secured to the sleeve 32. It will also be observed by reference to Figures 1 and 2a of the drawings that the sleeve 32 has a spur gear 34 mounted thereon for relative movement thereabout. A pair of ears 35 project in spaced relation from the outer face of the gear 34, and a shaft 36 carrying a worm screw 37 is rotatably supported in said ears, the screw 37 being in mesh with the worm wheel 33. An end of the shaft 36 is extended beyond one of the ears and is squared as at 38. By adjusting the shaft 36, adjustment of the gear 34 about the sleeve 32 and shaft 30 can be effected for varying the relative positions of the gears 34 and 29.

A rack bar 39 is slidable back and forth in a guideway 40 on the frame bed 6, and this rack meshes with the spur gear 34 in the manner illustrated in Figures 1 and 2a of the drawings. The rack bar carries a depending roller 41 which engages in an annular control groove in the cam 42 rotatable with the shaft 7. Thus, as the shaft 7 is rotated, the cam 42 will shift the rack bar 39 back and forth, and this reciprocable movement will be transmitted, through the gear and rack connections 34, 29 and 27, to the unloader sleeve 25. It will be obvious that by adjusting the relative positions of the gears 34 and 29 by manipulation of the worm shaft 36 in the manner hereinbefore described, the position in space of the sleeve 25 can be altered to suit conditions of operation of the machine.

The rotation of the shaft 7 is transmitted to the shaft 8 through an intermeshing gear couple 43 including a small spur gear fixed on the shaft 7 and a larger spur gear equipment fixed on the shaft 8. The larger spur gear equipment is adjustable about the shaft 8 as at 44 so that the relation of the two shafts 7 and 8 can be altered for altering timing of mechanisms actuated by the respective shafts.

A grooved cam 45 is fixed to the shaft 8, and this shaft also carries a plate cam 46 which is adjustably mounted on the shaft and includes an edge recess equipment 47, the purpose of which will later become apparent.

A shaft or column 48 is vertically disposed within and projected above and below the unloader sleeve 25, the lower end of the shaft being mounted in a bearing 49 formed in a bracket 50 depending from the frame bed in the manner best shown in Figures 1 and 2a of the drawings. A bevel gear 51 is affixed to the shaft 48 and meshes with a larger bevel gear 52 secured upon one end of a shaft 53 horizontally rotatable in a bearing 54 formed in the depending bracket 50. At its other end the shaft 53 carries a rotor 55 having three actuator rollers 56 projecting from its outer face and disposed in equidistantly spaced relation. The lower edge portion of the rotor 55 dips in a lubricating well 57 supported by the bracket 50.

The rollers 56 are engaged and moved step by step by a grooved cam 58 secured upon the shaft 7. The parts 58, 56, 52 and 51 are so proportioned and co-related that each step movement imparted to the shaft 53 will impart a half rotation to the shaft or column 48. Thus the shaft 48 is moved to swing the diametrically oppositely disposed end portions of the gripper and translator head D through successive arcs of 180° each to alternately position said ends over a receiving station at which empty cans are unloaded or withdrawn from cartons, and a delivery station at which the unloaded cans are deposited onto the takeoff conveyor or unscrambling belt E.

In order to prevent overthrow of the cross arm or translator head D at the respective stations, a stop disk 59 is adjustably secured to the lower end of the shaft or column 48. This disk is provided with two diametrically oppositely disposed stop recesses or notches 60 engageable by a stop dog 61 pivoted as at 62 on a supporting bracket extension 63. The dog 61 includes an extension 64 which is engaged by an adjustable length plunger 65 which is slidable in a bearing 66. The dog 61 is held against the periphery of the disk 59 by an anchored spring 67 and drops into one of the recesses 60 as the disk and column reach a position for presenting one of the cross arm ends at one of the stations so as to definitely stop the disk and column and prevent overthrowing of said arm ends. The slide 65 carries a roller 68 at its outer end which is engaged by the plate cam 46. The recess equipment 47 of the cam opposes the roller 68 each time a stop station of the disk 59 is presented so as to permit entry of the stop dog 61 into the stop recess 60. The cam 46 actuates the plunger 65 to release the dog at the proper time so that movement of the column 47 can be effected, and again releases the dog for locking engagement with the disk in time to permit the dog to render accurate the next positioning of the arm end at one of the stations, see Figures 1, 2a, 6 and 7.

A table supporting column or sleeve 69 is vertically slidable in the standard 24 and is provided with a rack face 70 which is accessible through an opening 71 formed in said standard. The rack face is engaged by a rack sector 72 which includes opposed, relatively adjustable plate portions 73 and is pivoted as at 74 on a bearing extension 75 from the standard. The adjustable plate portion of the sector 72 is link-connected as at 76 with one end of a lever 77 which is pivoted intermediate its ends on a pivot pin 78 and has its lower end portion extended down into the frame bed 6 in the manner illustrated in Figures 1 and 3a of the drawings. The pivot pin 78 is carried by a block member which is vertically slidable in a guideway formed in the lower end of the bearing standard 79, said block member being designated 80. The block 80 is vertically adjustable in the guideway through the medium of a screw 81 adjustable in the head portion of the bearing standard 79 and having its lower end rotatably anchored in the block 80. The block 80 has an extension 82 to which the upper end of a supporting arm 83 is pivotally connected as at 84. The lower end of the arm 83 is pivotally connected as at 85 with the lower end of the lever 77 and this conjoint pivotal connection carries a roller 86 which projects into the grooveway in the rotary cam 45 hereinbefore referred to.

As the cam 45 is rotated, the lower end of the lever 77 is oscillated about the pivot pin 78, thus causing the gear sector 72 to oscillate and impart vertical reciprocation to the carton table supporting sleeve or column 69. By adjusting the elevation of the block 80 the lever 77 can be raised or lowered, and by this means the position of the fulcrum about which the lever 77 rocks may be altered with respect to the distance thereof from the sector connected end of said lever for increasing or diminishing the degree of reciprocatory movement imparted to the sleeve or column 69. It will be obvious that when vertical adjustments of the pivot pin 78 are made the relation of the lever 77 to the vertical will be altered, and this re-positioning of the lever 77, caused by vertical adjustment of the fulcrum pin 78 about which it rocks, can be compensated for by adjustment of the relatively adjustable plate portions 73 hereinbefore referred to. By this means the zone of movement of the carton supporting table can be altered to adapt the machine for operation in connection with cans of different sizes. In order to facilitate this adaptation of the machine for operations in connection with cans of different sizes, a pointer 87 is projected from the block 80 through a slot 88 in the bearing standard 79, and a suitable scale 89 is affixed to the standard beside the slot to clearly indicate the existing adjustment, see Figure 3a.

The vertically reciprocable sleeve or column 69 carries a skeleton housing or spider 90 at its upper end and on this housing a carton supporting table 91 is secured in the manner illustrated in Figures 1 and 4 of the drawings. The table includes an abutment rail 92 at one side thereof and a carton flap retaining rail 93 disposed above the abutment rail and supported upon suitable standards 94 attached to the abutment rail. The flap retaining rail 93 is opposed by a similar rail 95 supported upon suitable standards 96 at the opposite sides of the table, see Figure 1. The rail supporting standards 96 are secured upon bearing members 97 which are adjustably secured through the medium of slot and clamp screw equipments 98 upon a slide member 99 slidably supported on an extended portion 100 of the table. Each bearing member 97 slidably supports a plunger 101 having an abutment head 102 normally held against the bearing by a spring 103 interposed between the bearing and a yieldable material faced presser head 104 carried at the other end of the plunger in position for engagement with a carton supported on the table.

A thrust bar 105 is connected with the slide and carries a depending roller 106 which engages in a grooveway formed in a cam 107 secured upon the upper end of a shaft 108 mounted in and having its respective ends projected above and below the sleeve or column 69. The cam 107 rotates within the skeleton housing 90 and causes the slide 99 to move inwardly and outwardly for causing the presser head 104 to yieldably press a carton on the table against the abutment flange 92 so that the carton will be held against upward movement with tiers of cans being withdrawn therefrom. The clamped condition of a carton is indicated in Figure 1 of the drawings, and this figure also illustrates the manner in which the rails 93 and 95 hold the carton flaps against outward movement.

At its lower end the shaft 108 is spline-connected as at 109 with a spiral gear 110 supported against vertical movement between bearing portions 111 and having rotation imparted thereto through a like gear 112 rotatable with the shaft 8.

A carton 113 is shown securely held upon the supporting table in Figures 1 and 4 of the drawings, and in these figures the upper and lower tiers of empty cans selectively presented for engagement by the grippers by lifting and lowering of the sleeve or column 69 and the table 91 supported thereon are indicated at 114. The side flaps of the carton held against free outward movement by the rails 93 and 95 in both positions of the table are designated 115.

A head sleeve 116 is clamped as at 117 to the upper end of the standard 23, and this sleeve extends above the standard and has its front and rear sides cut away as at 118. The upper extremity of the head sleeve is provided with horizontal flange portions 119 as is best shown in Figures 1, 2 and 4 of the drawings.

A thrust bearing 120 surrounds the shaft or column 48 at the top of the sleeve 25 which is vertically reciprocable within the standard 23 and head sleeve 116, and the central hub or sleeve portion 121 of the translator head D is splined as at 122 on the shaft or column 48 which passes upwardly therethrough. The hub 121 of the translator head D is therefore vertically slidable on and movable about its axis with the shaft or column 48.

The translator head D includes diametrically oppositely disposed end arm portions 123 each including bottom and side web portions in the manner best illustrated in Figures 2, 4 and 5 of the drawings.

An annular groove 124 is formed in the lower end of the hub 121, and a pair of diametrically oppositely disposed releasable coupling hooks 125 hook into this groove and have their body portions depending slidably in blocks 126 affixed to the opposite sides of the sleeve 25 within the cutouts 118 in the head sleeve 116. See Figures 3 and 4. Each hook 125 has a face recess 127 within the associated block 126, and each such recess is adapted to normally receive a releasable clutch ball 128 mounted in the block and urged into the seat by a spring pressed head pin 129 which projects from the block as at 130. One of the projecting pin ends 130 engages an end of a lever 131 pivoted intermediate its ends on a switch block 132 secured to one of the blocks 126. The other end of the lever 131 engages a switch button of a circuit controlling switch within the block 132. Whenever the switch lever is in the normal position illustrated in Figure 3 of the drawings, normal operation of the parts will be had, but whenever an overload is placed upon the release connection of 125, 128, as by jam engagement with a carton or the like, the balls 128 will ride out of the recesses 127 and release the connection between the hub 121 and the sleeve 25. This displacement of the engaging ball will rock the lever 132 and cause the switch button 133 to be actuated for breaking the motor circuit and discontinuing operation of the machine.

It will be observed by reference to Figures 1, 2 and 4 of the drawings that a skeleton frame unit 134 depends from the end of each translator head arm 123. Each frame unit rotatably supports four rods 135 arranged in two parallel pairs, each pair being connected by links 136 to rock in opposite directions. The connecting pivot of a pair of links 136 associated with each pair of rods 135 is connected with the lower end of a thrust link 137 from which a pin 138 projects into position for engaging a portion of the frame unit 134 to limit downward movement of said links. Each pair of rods carries three opposed sets of depending crank members 139 at the lower ends of which individual ribbed gripping rollers 140 are carried. These rollers are formed of rubber or some other suitable yieldable material, and an anchored spring 141 normally serves to hold the cranks 139 in separated or non-gripping relation, see Figures 2 and 4.

A cross head 142 has its ends connected with the upper ends of the thrust links associated with each gripping means, and a vertically disposed actuator rod 143 is connected with each cross head and is normally forced down to the gripper roller separating position by a compression spring 144 interposed between a portion of the respective frame unit 134 and an abutment head carried by the rod 143. Each rod 143 is extended above the base web of the respective translator head arm 123 and is connected to the short end of a bell crank lever 145 pivoted as at 146 on said arm. The long arm of each bell crank lever is connected by a link 147 with the long arm of a similar bell crank lever 148 pivoted as at 149 to the head adjacent the hub 121 thereof. An actuator pin 150 depends from the short end of each of the inwardly positioned bell crank levers 148, and it will be observed by reference to Figure 4 of the drawings that these pins depend below the base web of the translator head arms 123 for engagement with the actuator pins 151 adjustably secured in and projecting upwardly from the flange portions 119. Each of the long arms of the bell crank lever 148 carries a pin 152 engageable with the free end of a latch arm 153 pivotally supported as at 154 on the respective arm 123 and normally held down so that its free end is below the path of movement of the respective pin 152 by a tension spring 155, see Figures 4 and 5 of the drawings.

A single release pin 156 is supported upon the flange 119 adjacent the delivery station, and this release pin is preferably formed of two telescopic sections, the upper one of which is yieldably projected as at 157. See Figure 10. An apertured center boss 158 is formed in the base web of each arm extension 123 adjacent the hub 121, and these bosses are selectively entered by a centering pin 159 projecting upwardly from a standard flange 119 at one of the stations for the purpose of accurately centering or positioning the arms at the respective stations.

In operation, cartons having empty cans packed therein in rows and superposed tiers are fed one by one onto the table 91 through the medium of any suitable form of feed-in mechanism. Such a mechanism is only diagrammatically illustrated and generally designated C. The parts are so timed that cartons individually fed onto the table are clamped thereon between the rail 92 and the presser heads 104 so that any frictional drag occasioned during withdrawal upwardly of tiers of cans will be resisted and lifting of the carton guarded against.

As soon as the carton is properly clamped on the table 91, the gripper frame unit 139 disposed above the carton at the receiving station will be lowered to the position illustrated in Figure 1 so as to place the gripper rollers 140 in position for gripping the cans of the upper tier in the manner illustrated in Figures 1 and 2 of the drawings. As the translator head is moved downwardly with the sleeve 25 through the medium of cam and gearing connections 42, 39, 29, 27, the actuator pin 150 associated with that particular gripping means will engage the suitably adjusted screw pin 151 to actuate the bell crank and link equipment 148, 147, 145 and impart a lifting movement to the rod 143 which will serve to move the gripping rollers to the gripping position illustrated in Figure 2. The gripping relation of the rollers is retained by frictional contact between the latch device 153 and the respective cross pin 152. As the translator head descends the latch actuating pin 156 moves upwardly through the base web of the presented arm and lifts the latch 153 into the position illustrated in Figure 4 of the drawings, in which position the free end of the latch is disposed in the path of movement of the bell crank carried pin 152 so as to intercept the pin and prevent movement of the link 147 and the rod 143 in a direction for releasing the gripping relation of the rollers. As the sleeve 25 and the gripping unit is now raised by the cam and gearing equipment just referred to, the tier of gripped cans will be lifted out of the carton. It should be understood that frictional contact between the pin 152 and the free end of the latch 153 will serve to prevent downward movement of the latch and retain the gripping relation of the rollers.

After the gripping unit bearing the gripped tier of cans reaches its elevated position, the indexing equipment 58, 56, 53, 51 will impart 180° of movement to the shaft or column 48 to translate the arm from the receiving station to the delivery station. Following arrival of the arm at the delivery station, the sleeve 25 will again be lowered in the manner hereinbefore described, and the depending pin 150 will engage the suitably adjusted actuator screw 151 located at the delivery station. The screw 151 will move the pin 150 upwardly so as to relieve the frictional contact between the pin 152 and the latch end 153, thereby permitting the spring 155 to lower the latch out of the path of the pin 152, and the springs 144 and 141 will bring about a separation of the gripping rollers 140 and the releasing of the tier of cans gripped thereby. This operating cycle is repeated over and over and it will be obvious that as each gripping means is lowered into gripping relation at the receiving station and thereafter actuated to grip and lift a tier of cans, the companion gripping means carried by the diametrically opposed arm 123 will be effecting the release or delivery of a tier of cans at the delivery station.

After each upper tier of cans has been removed from a given carton the table supporting column 69 is moved upwardly so as to present the lower tier of cans in that carton for gripping engagement by the gripping means next to be presented, following removal of the lower tier of cans in a carton the table will be lowered into its initial position, the empty carton unclamped by properly timed movement of the cam 107 will be removed from the table, and another filled carton will be fed onto said table so that the operations hereinabove described can be repeated.

In Figures 15 through 20 of the drawings, there is illustrated a modified form of gripping means in which the can gripping and releasing function are performed pneumatically. It is to be understood that the term "gripping means" herein extensively used is employed in the broad sense and is intended to comprehend equipments in which gripping elements are brought into opposition with can portions therebetween, and also equipments in which the cans are gripped by suction or pneumatic action.

In the modified equipment herein disclosed, the head sleeve or standard is designated 160, and the horizontal flange portions thereof are designated 161. The shaft or column is indicated at 162, and the vertically reciprocable sleeve disposed between the element 160 and the column 162 is designated 163. The gripper and translator head includes a hub 164 slidable on and rotatable with the shaft 162 and includes the diametrically oppositely extended arms 165 as in the form previously described.

The lower end of the hub 164 is annularly grooved to receive overload release clutch hooks 166 as in the form of the invention previously described, see Figure 20, and since the construction and operation of this head releasing and motor controlling equipment has been described hereinbefore in detail, repetition at this point is considered unnecessary.

A valve ring 167 is interposed between the hub 164 and the upper end of the sleeve 163 and includes an annular duct 168 in which a vacuum is drawn by a pump or other evacuating means (not shown) through a suitable conduit 169 connected with the ring. The hub 164 is provided with an individual upright duct 170 at each side thereof, and each of these ducts communicates at its lower end with the valve ring duct 168.

A skeleton frame 171 depends from the end of each arm 165 and each is of a size for making free entry into the open upper end of a carton from which tiers of cans are to be removed. The base portion of each unit 171 carries a plurality (12 being shown) of rubber suction cups 172, each disposed for centrally engaging the bottom of a can disposed in inverted position in a carton. Each suction cup is removably secured as at 173 to the respective frame unit, and the interior of each cup communicates with manifold duct equipment 174 in the base 175 of the respective unit. The manifold duct equipment 174 communicates with a duct 176 formed in a valve block 177 secured upon the respective frame unit base 175, and each of these blocks includes a vertical valve bore 178 which is traversed by the respective duct 176 in the manner best illustrated in Figure 17 of the drawings.

A valve plunger 179 is vertically reciprocable in each valve bore 178, and these valves prevent communication of the manifold duct equipments 174 with the suction source except when the annular port or clearance 180 in the respective valve body is disposed in alignment with the traversing duct 176 in the manner illustrated in Figure 17. A compression spring 181 normally holds each valve in its lowered, closed position. See the dotted line position in Figure 17 of the drawings.

It will be observed by reference to Figure 17 that each of the valves 179 carries a depending plunger 182 which extends below the associated suction cup 172 and carries an enlarged head 183 adapted for engagement with a can bottom as the gripping unit is lowered into position for causing its suction cups to engage a tier of cans. By this means the valves 179 will be lifted to the suction source communicating position illustrated in full lines in Figure 17 only by contact of the plunger 182 with a can, and thus the evacuation of the cups is effected only during the period of engagement of the cups with the inverted cans.

Each valve block duct 176 is connected by a conduit 184 with a suction duct 185 disposed horizontally in a valve block 186 secured on the respective head arm 165 adjacent the head hub 164, see Figures 15 and 16. Each valve block 186 includes a vertical valve bore 187 in which a valve plunger 188 is vertically reciprocable. Each of the valve bodies 188 includes an annular port or clearance 189 for at times opening communication between the duct 184, 185 and the associated hub duct 170. It will be noted also that each valve block includes a cross duct 190 traversing the valve bore 187 and open to atmosphere and which is rendered effective for atmospheric air admitting purposes each time the valve body clearance or port 189 is moved into registry therewith. Each cross duct 190 communicates with the respective suction duct 185 through a vertical leg 191.

The valve bodies 188 are normally held in their lowermost position by compression spring equipments 192, and it will be noted that in their lowered, normal position the valves 188 open communication through the suction ducts 185 and close off atmospheric air communication. An aperture 193 is formed in the base web of the arms beneath each valve bore 187, and at the delivery station the respective horizontal flange 161 carries an adjustable actuator screw 194 effective as the respective arm 164 is lowered to pass through the aligned aperture 193 and displace the respective valve 188 from the normal position illustrated in Figure 18 to the atmospheric air communicating, suction relieving position illustrated in Figures 15 and 19.

In this form of the invention, as each gripping means is presented to a tier of inverted cans in a carton at the can receiving station, the plunger 183 will be displaced by engagement with a can and will shift the valve 179 to the suction grip effecting position illustrated in Figure 17, causing the tiers of cans to be gripped by the suction cups. This suction-gripped condition of the cans will continue during the lifting of the arm and its translation to the delivery station, and when the arm is lowered at the delivery station, as illustrated in Figure 15, the valve 188 will be moved to the position illustrated in Figure 19 to thereby relieve the suction and release the tier of cans from the cups 172.

It is of course to be understood that the details of structure and arrangement of parts may be variously changed and modified without departing from the spirit and scope of my invention.

I claim:

1. In a machine of the character described, a support for a carton from which cans are to be unloaded, can unloading means including a cross arm pivotally mounted intermediate its ends and having its ends diametrically oppositely disposed, mechanical can gripping means carried by each end of said cross arm, means for moving the cross arm ends about the pivot through successive arcs of 180° each to successively present each cross arm end at a receiving station over a carton and then over a delivery station, means for bringing about relative movement between the cross arm and the cartons at both stations for causing said gripping means to enter and then withdraw from said cartons, means operable by said relative movement at the receiving station for causing each said mechanical gripping means to close and grip cans, and means operable by said relative movement at the delivery station to cause each said mechanical gripping means to open and release cans.

2. In a machine of the character described, a support for a carton from which cans arranged in upper and lower tiers are to be unloaded tier after tier, can unloading means including a cross arm pivotally mounted intermediate its ends and having its ends diametrically oppositely disposed, can gripping means carried by each end of said cross arm, means for moving the cross arm ends about the pivot through successive arcs of 180° each to successively present each cross arm end at a receiving station over a carton and then over a delivery station, means for bringing about relative movement between the carton support and the can gripping means as they are presented at the receiving station to cause the superposed can tiers to be presented one after the other in position for being gripped by a gripping means, means at the receiving station for causing each gripping means to grip cans, and means at the delivery station to cause each gripping means to release cans.

3. In a machine of the character described, a support for a carton from which cans arranged in upper and lower tiers are to be unloaded tier after tier, can unloading means including a cross arm pivotally mounted intermediate its ends and having its ends diametrically oppositely disposed, can gripping means carried by each end of said cross arm, means for moving the cross arm ends about the pivot through successive arcs of 180° each to successively present each cross arm end at a receiving station over a carton and then over a delivery station, means for bringing about relative movement between the carton support and the can gripping means as they are presented at the receiving station to cause the superposed can tiers to be presented one after the other in position for being gripped by a gripping means, means for moving each receiving station presented gripping means toward the carton support to position said gripping means in gripping relation to a tier of cans, means for moving the carton support toward alternately presented gripping means for positioning lower tiers of cans for being gripped by said gripping means, means at the receiving station for causing each gripping means to grip cans, and means at the delivery station to cause each gripping means to release cans.

4. In a machine of the character described, a support for a carton from which cans arranged in upper and lower tiers are to be unloaded tier after tier, can unloading means including a cross arm pivotally mounted intermediate its ends and having its ends diametrically oppositely disposed, can gripping means carried by each end of said cross arm, means for moving the cross arm ends about the pivot through successive arcs of 180° each to successively present each cross arm end at a receiving station over a carton and then over a delivery station, means for bringing about relative movement between the carton support and the can gripping means as they are presented at the receiving station to cause the superposed can tiers to be presented one after the other in position for being gripped by a gripping means, means for moving each receiving station presented gripping means toward the carton support to position said gripping means in gripping relation to a tier of cans, means for moving the carton support toward alternately presented gripping means for positioning lower tiers of cans for being gripped by said gripping means, means for varying the degree of carton support movement to adapt the machine for unloading cans of different sizes, means at the receiving station for causing each gripping means to grip cans, and means at the delivery station to cause each gripping means to release cans.

5. In a machine of the character described, a support for a carton from which cans arranged in upper and lower tiers are to be unloaded tier after tier, can unloading means including a swingably mounted arm carrying a can gripping means and means for swinging the arm to alternately present the gripping means at a receiving station over a carton on said support and then at a delivery station, means for moving the arm and the carton support toward and from each other at the receiving station to cause the superposed can tiers to be presented one after the other in position for being gripped and removed from the carton by the gripping means, means at the receiving station for causing each gripping means to grip cans, and means at the delivery station to cause each gripping means to release cans.

6. In a machine of the character described, a support for a carton from which cans arranged in upper and lower tiers are to be unloaded tier after tier, can unloading means including an arm carrying a can gripping means and means for moving the arm to alternately present the gripping means at a receiving station over a carton on said support and then at a delivery station, means for moving the gripping means toward the carton support when at the receiving station to position said gripping means in gripping relation to a tier of cans, means for moving the carton support toward the gripping means upon alternate presentations thereof at the receiving station for positioning lower tiers of cans for being gripped by said gripping means, means at the receiving station for causing each gripping means to grip cans, and means at the delivery station to cause each gripping means to release cans.

7. In a machine of the character described, a support for a carton from which cans arranged in upper and lower tiers are to be unloaded tier after tier, can unloading means including an arm carrying a can gripping means and means for moving the arm to alternately present the gripping means at a receiving station over a carton on said support and then at a delivery station, means for moving the gripping means toward the carton support when at the receiving station to position said gripping means in gripping relation to a tier of cans, means for moving the carton support toward the gripping means upon alternate presentations thereof at the receiving station for positioning lower tiers of cans for being gripped by said gripping means, means for varying the degree of carton support movement to adapt the machine for unloading cans of different sizes, means at the receiving station for causing each gripping means to grip cans, and means at the delivery station to cause each gripping means to release cans.

8. In a machine of the character described, a support for a carton from which cans are to be unloaded, can unloading means including a cross arm pivotally mounted intermediate its ends and having its ends diametrically oppositely disposed, can gripping means carried by each end of said cross arm, means for moving the cross arm ends about the pivot through successive arcs of 180° each to successively present each cross arm end at a receiving station over a carton and then over a delivery station, means effective upon completion of each 180° of movement of the arm for locking the cross arm in position and preventing overthrow of said arm at the station positions, means at the receiving station for causing each gripping means to grip cans, and means at the delivery station to cause each gripping means to release cans.

9. In a machine of the character described, a support for a carton from which cans are to be unloaded, can unloading means including a cross arm pivotally mounted intermediate its ends and having its ends diametrically oppositely disposed, can gripping means carried by each end of said cross arm, means for moving the cross arm ends about the pivot through successive arcs of 180° each to successively present each cross arm end at a receiving station over a carton and then over a delivery station, a disk movable with the arm and having two diametrically oppositely disposed lock recesses therein each associated with one said station, a stationarily supported spring urged detent member engageable in each recess as it registers therewith for preventing overthrowing of said arm at the station positions and for locking the cross arm with the gripping means registered at said stations, means movable in timed relation with the arm moving means for releasing the detent member to permit a movement of the arm and then recondition said detent member for its next arm locking recess engagement, means at the receiving station for causing each gripping means to grip cans, and means at the delivery station to cause each gripping means to release cans.

10. In a machine of the character described, a support for a carton from which cans arranged in upper and lower tiers are to be unloaded tier after tier, can unloading means including supporting arm equipment and can gripping equipment supported by said arm equipment and means for moving the arm equipment to successively present gripping equipment at a receiving station over a carton on said support and at a delivery station, means for moving the arm equipment toward the carton support when at the receiving station to position gripping equipment in gripping relation to a tier of cans, means for moving the carton support toward the arm equipment upon alternate presentations of gripping equipment thereto at the receiving station for positioning lower tiers of cans for being gripped by said gripping equipment, means on and movable with the carton support for securing a carton thereon while cans are being withdrawn therefrom, means at the receiving station for causing gripping equipment to grip cans, and means at the delivery station to cause gripping equipment to release cans.

11. In a machine of the character described, a support for a carton from which cans arranged in upper and lower tiers are to be unloaded tier after tier, can unloading means including supporting arm equipment and can gripping equipment supported by said arm equipment and means for moving the arm equipment to successively present gripping equipment at a receiving station over a carton on said support and at a delivery station, means for moving the arm equipment toward the carton support when at the receiving station to position gripping equipment in gripping relation to a tier of cans, means for moving the carton support toward the arm equipment upon alternate presentations of gripping equipment thereto at the receiving station for positioning lower tiers of cans for being gripped by said gripping equipment, means on and movable with the carton support for securing a carton thereon while cans are being withdrawn therefrom, means also mounted on and movable with the carton support for holding carton flaps open and against free movement, means at the receiving station for causing gripping equipment to grip cans, and means at the delivery station to cause gripping equipment to release cans.

12. In a machine of the character described, a support for a carton from which cans arranged in upper and lower tiers are to be unloaded tier after tier, can unloading means including supporting arm equipment and can gripping equipment supported by said arm equipment and means for moving the arm equipment to successively present gripping equipment at a receiving station over a carton on said support and at a delivery station, means for moving the arm equipment toward the carton support when at the receiving station to position gripping equipment in gripping relation to a tier of cans, means for moving the carton support toward the arm equipment upon alternate presentations of gripping equipment thereto at the receiving station for positioning lower tiers of cans for being gripped by said gripping equipment, means on and movable with the carton support for securing a carton thereon while cans are being withdrawn therefrom, and including a slide member having a carton clamp mounted thereon for movement into and out of engagement with a carton and a rotary cam connected with the slide and effective to bring about the necessary periods of engagement and disengagement of the clamp and carton, means at the receiving station for causing gripping equipment to grip cans, and means at the delivery station to cause gripping equipment to release cans.

13. In a machine of the character described a table for supporting a carton from which cans arranged in upper and lower tiers are to be unloaded tier after tier, means for removing cans from the carton tier by tier, means for alternately moving said can removing means into and from a carton on said table, and means for moving the table to successively present the individual tiers of cans in a carton thereon for individual removal therefrom.

14. In a machine of the character described a table for supporting a carton from which cans arranged in upper and lower tiers are to be unloaded tier after tier, means for removing cans from the carton tier by tier, means for alternately moving said can removing means into and from a carton on said table, means for moving the table to successively present the individual tiers of cans in a carton thereon for individual removal therefrom and means for variably controlling the degree of movement imparted to the table to adapt the machine for the handling of cans of different sizes.

15. In a machine of the character described a table for supporting a carton from which cans arranged in upper and lower tiers are to be unloaded tier after tier, means for removing cans from the carton tier by tier, means for moving the table to successively present the individual tiers of cans in a carton thereon for individual removal therefrom and means on and movable with the table for securing a carton thereon while cans are being withdrawn therefrom.

16. In a machine of the character described a table for supporting a carton from which cans arranged in upper and lower tiers are to be unloaded tier after tier, means for removing cans from the carton tier by tier, means for moving the table to successively present the individual tiers of cans in a carton thereon for individual removal therefrom, means on and movable with the table for securing a carton thereon while cans are being withdrawn therefrom and means also mounted on and movable with the table for holding carton flaps open and against free movement.

17. In a machine of the character described a table for supporting a carton from which cans arranged in upper and lower tiers are to be unloaded tier after tier, means for removing cans from the carton tier by tier, and means for moving the table to successively present the individual tiers of cans in a carton thereon for individual removal therefrom, said last named means including a column on which the table is supported and having a rack portion, a pivoted driving sector meshing with the rack portion, a pivoted rocker lever, and means for imparting rocking movement to said lever.

18. In a machine of the character described a table for supporting a carton from which cans arranged in upper and lower tiers are to be unloaded tier after tier, means for removing cans from the carton tier by tier, means for moving the table to successively present the individual tiers of cans in a carton thereon for individual removal therefrom, said last named means including a column on which the table is supported and having a rack portion, a pivoted driving sector meshing with the rack portion, a pivoted rocker lever, means for imparting rocking movement to said lever and means for adjusting the pivot center of said lever to vary the degree of movement imparted to the table so as to adapt the machine for the handling of cans of different sizes.

19. In a machine of the character described a table for supporting a carton from which cans arranged in upper and lower tiers are to be unloaded tier after tier, means for removing cans from the carton tier by tier, means for moving the table to successively present the individual tiers of cans in a carton thereon for individual removal therefrom, said last named means including a column on which the table is supported and having a rack portion, a pivoted driving sector meshing with the rack portion, a pivoted rocker lever, means for imparting rocking movement to said lever; and means on and movable with the table for securing a carton thereon while cans are being withdrawn therefrom and including a slide member having a carton clamp mounted thereon for movement into and out of engagement with a carton, a shaft rotatable within and projecting above said column, and a rotary cam mounted on said shaft and connected with the slide and effective to bring about the necessary periods of engagement and disengagement of the clamp and carton.

20. In a machine of the character described, a support for a carton from which cans are to be unloaded, can unloading means including a cross arm pivotally mounted intermediate its ends and having its ends diametrically oppositely disposed, can gripping means carried by each end of said cross arm, means for moving the cross arm ends about the pivot through successive arcs of 180° each to successively present each cross arm end at a receiving station over a carton and then over a delivery station, means at the receiving station for receiving cans, means for moving the cross arm ends downwardly each time one said cross arm end is presented over the receiving station to present the gripping means at that station in gripping relation with a tier of cans, and means effective at the receiving station each time the cross arm ends are lowered for causing the gripping means to grip a tier of cans and similarly effective at the delivery station for releasing the gripping means for depositing a tier of cans on said receiving means.

21. In a machine of the character described, a support for a carton from which cans are to be unloaded, can unloading means including a cross arm pivotally mounted intermediate its ends and having its ends diametrically oppositely disposed, can gripping means carried by each end of said cross arm, means for moving the cross arm ends about the pivot through successive arcs of 180° each to successively present each cross arm end at a receiving station over a carton and then over a delivery station, means at the receiving station for receiving cans, means for moving the cross arm ends downwardly each time one said cross arm end is presented over the receiving station to present the gripping means at that station in gripping relation with a tier of cans, and means effective at the receiving station each time the cross arm ends are lowered for causing the gripping means to grip a tier of cans, means for latching the gripping means in can gripping engagement, and means at the delivery station for releasing the latch and effecting a delivery of a tier of cans on said receiving means.

22. In a machine of the character described, a support for a carton from which cans are to be unloaded, can unloading means including a cross arm pivotally mounted intermediate its ends and having its ends diametrically oppositely disposed, can gripping means carried by each end of said cross arm, means for moving the cross arm ends about the pivot through successive arcs of 180° each to successively present each cross arm end at a receiving station over a carton and then over a delivery station, each said gripping means including a frame depending from the respective cross arm end, a pair of shafts rockably supported in the depending frame in parallel spaced relation, a row of grip levers depending from each shaft, a gripping member of yieldable material carried by each grip lever, means at the receiving station for receiving cans, means for moving the depending frames downwardly each time one said frame is presented over the receiving station whereby the grip levers are lowered into a tier of cans in a carton, means normally urging the grip levers to a non-gripping position, means effective during lowering of a depending frame at the receiving station for moving the grip levers to their gripping position, means for latching the grip levers in the gripping position, and means at the delivery station for releasing the latching means to free the grip levers and deposit a tier of cans on said receiving means.

23. In a machine of the character described, a support for a carton from which cans arranged in upper and lower tiers are to be unloaded tier after tier, can unloading means including a cross arm pivotally mounted intermediate its ends and having its ends diametrically oppositely disposed, can gripping means carried by each end of said cross arm, means for moving the cross arm ends about the pivot through successive arcs of 180° each to successively present each cross arm end at a receiving station over a carton and then over a delivery station, means for bringing about relative movement between the carton support and the can gripping means as they are presented at the receiving station to cause the superposed can tiers to be presented one after the other in position for being gripped by a gripping means, means for moving each receiving station presented gripping means toward the carton support to position said gripping means in gripping relation to a tier of cans, means for moving the carton support toward alternately presented gripping means for positioning lower tiers of cans for being gripped by said gripping means, means for varying the relative timing of the carton supporting means and the gripping means toward and away from each other at the receiving station, means at the receiving station for causing each gripping means to grip cans, and means at the delivery station to cause each gripping means to release cans.

24. In a machine of the character described, a support for a carton from which cans are to be withdrawn, can unloading means including a cross arm having its ends diametrically oppositely disposed, a centrally depending pivot shaft, and can gripping means depending from each cross arm end, a supporting column, a sleeve vertically reciprocable in and projecting upwardly from said column, means for supporting the cross arm on the sleeve for vertical movement therewith and for movement about its center independently of said sleeve, motor driven means for lifting and lowering the sleeve to move the gripping means into and out of can gripping position and for moving the shaft through rotative steps of 180° each to successively present each gripping means at a receiving station over a carton and then over a delivery station, means at the receiving station for causing each gripping means to grip cans, and means at the delivery station to cause each gripping means to release cans.

25. In a machine of the character described, a support for a carton from which cans are to be withdrawn, can unloading means including a cross arm having its ends diametrically oppositely disposed, a centrally depending pivot shaft, and can gripping means depending from each cross arm end, a supporting column, a sleeve vertically reciprocable in and projecting upwardly from said column, means for supporting the cross arm on the sleeve for vertical movement therewith and for movement about its center independently of said sleeve, motor driven means for lifting and lowering the sleeve to move the gripping means into and out of can gripping position and for moving the shaft through rotative steps of 180° each to successively present each gripping means at a receiving station over a carton and then over a delivery station, overload release means separably connecting the sleeve and arm for movement together, means effective upon separation of said sleeve and cross arm for discontinuing operation of the motor, means at the receiving station for causing each gripping means to grip cans, and means at the delivery station to cause each gripping means to release cans.

26. In a machine of the character described, a support for a carton from which cans arranged in upper and lower tiers are to be unloaded tier after tier, can unloading means including a swingably mounted arm carrying a can gripping means and means for swinging the arm to alternately present the gripping means at a receiving station over a carton on said support and then at a delivery station, means for moving the arm and the carton support toward and from each other at the receiving station to cause the superposed can tiers to be presented one after the other in position for being gripped and removed from the carton by the gripping means, each said gripping means including a plurality of can engaging suction cups, means at the receiving station operable by can engagement during relative movement of the arm and the carton support toward each other for effecting evacuation of the cups for can gripping purposes, and means effective at the delivery station for relieving the vacuum in said cups to release cans gripped thereby.

27. In a machine of the character described, a support for a carton from which cans arranged in upper and lower tiers are to be unloaded tier after tier, can unloading means including a swingably mounted arm carrying a can gripping means and means for swinging the arm to alternately present the gripping means at a receiving station over a carton on said support and then at a delivery station, means for moving the arm and the carton support toward and from each other at the receiving station to cause the superposed can tiers to be presented one after the other in position for being gripped and removed from the carton by the gripping means, each said gripping means including a plurality of can engaging suction cups, a manifold suction duct carried by said arm communicating with all said cups, a vacuum source on said arm, valve means operable by can engagement at the receiving station during relative movement of the arm and the carton support toward each other for connecting the respective manifold duct with the vacuum source, and valve means effective at the delivery station for admitting air into the manifold duct to break the vacuum therein and release cans gripped by the cups.

28. In a machine of the character described, a support for a carton from which cans are to be withdrawn, can unloading means including a cross arm having its ends diametrically oppositely disposed, a centrally depending pivot shaft, and can gripping means depending from each cross arm end, a supporting column, a sleeve vertically reciprocable in and projecting upwardly from said column, means for supporting the cross arm on the sleeve for vertical movement therewith and for movement about its center independently of said sleeve, means for lifting and lowering the sleeve to move the gripping means into and out of can gripping position and for moving the shaft through rotative steps of 180° each to successively present each gripping means at a receiving station over a carton and then over a delivery station, each said gripping means including a plurality of can engaging suction cups, a manifold suction duct carried by said cross arm communicating with all said cups, a vacuum source on said arm, valve means operable by can engagement at the receiving station for connecting the respective manifold duct with the vacuum source, and valve means effective at the delivery station for admitting air into the manifold duct to break the vacuum therein and release cans gripped by the cups.

29. In a machine of the character described, a supporting arm, a can gripping means supported on and depending from the arm, means for moving the arm to alternately present the gripping means at a receiving station and at a delivery station, can filled carton supporting means at the receiving station and unloaded can supporting means at the delivery station, means for effecting movement of the gripping means toward the support at each station, each said gripping means including a plurality of can engaging suction cups, a manifold suction duct carried by said arm communicating with all said cups, a vacuum source on said arm, valve means operable by can engagement brought about by gripping means movement at the receiving station for connecting the respective manifold duct with the vacuum source, and valve means actuated by movement of the gripping means at the delivery station for admitting air into the manifold duct to break the vacuum therein and release cans gripped by the cups.

HERBERT L. MINAKER.